United States Patent [19]
Dolby

[11] Patent Number: 4,901,830
[45] Date of Patent: Feb. 20, 1990

[54] CLUTCH AND BRAKE APPARATUS OPERABLE BY COMPRESSIBLE FLUID, ESPECIALLY PNEUMATICALLY

[75] Inventor: Henrik Dølby, Horsens, Denmark
[73] Assignee: Danfoss A/S, Nordborg, Denmark
[21] Appl. No.: 222,759
[22] Filed: Jul. 22, 1988
[30] Foreign Application Priority Data
Aug. 14, 1987 [DE] Fed. Rep. of Germany ....... 3727173
[51] Int. Cl.⁴ ............................................. F16D 67/04
[52] U.S. Cl. ................ 192/18 A; 192/88 A; 192/110 R
[58] Field of Search .............. 192/12 C, 18 A, 110 R, 192/85 A, 87.17, 87.19, 85 V, 107 C, 88 A

[56] References Cited
U.S. PATENT DOCUMENTS

| | | | |
|---|---|---|---|
| 3,036,846 | 5/1962 | Peras | 192/88 A X |
| 3,166,167 | 1/1965 | Kinsman | 192/18 A |
| 3,378,121 | 4/1968 | Foret | 192/88 A X |
| 3,651,909 | 3/1972 | Zautaszwilli | 192/88 A |
| 4,381,833 | 5/1983 | Foret | 192/88 A X |
| 4,637,505 | 1/1987 | Huber | 192/88 A |
| 4,703,841 | 11/1987 | Lengsfeld et al. | 192/110 R X |

Primary Examiner—Rodney H. Bonck
Attorney, Agent, or Firm—Wayne B. Easton; Clayton R. Johnson

[57] ABSTRACT

A housing mounts an input shaft with a clutch flange thereon, an output shaft with a clutch plate thereon, and bearings, sleeves and adjustment nuts for retaining the shafts in selected axially adjusted positions. The clutch plate and flange extend within a clutch chamber of the housing. Friction linings are mounted on the radial outer portion of the flange on opposite sides thereof. The radial outer portions of the plate and flange have depressions into which the linings extend whereby the axial dimension of the chamber is less than the combined axial dimensions of the linings and the plate and flange radially inwardly of and adjacent to the depressions. Switching apparatus provides a pressure differential on axial opposite sides of the plate to eleastically deform the plate between a neutral position, a braking position and a driving position.

17 Claims, 2 Drawing Sheets

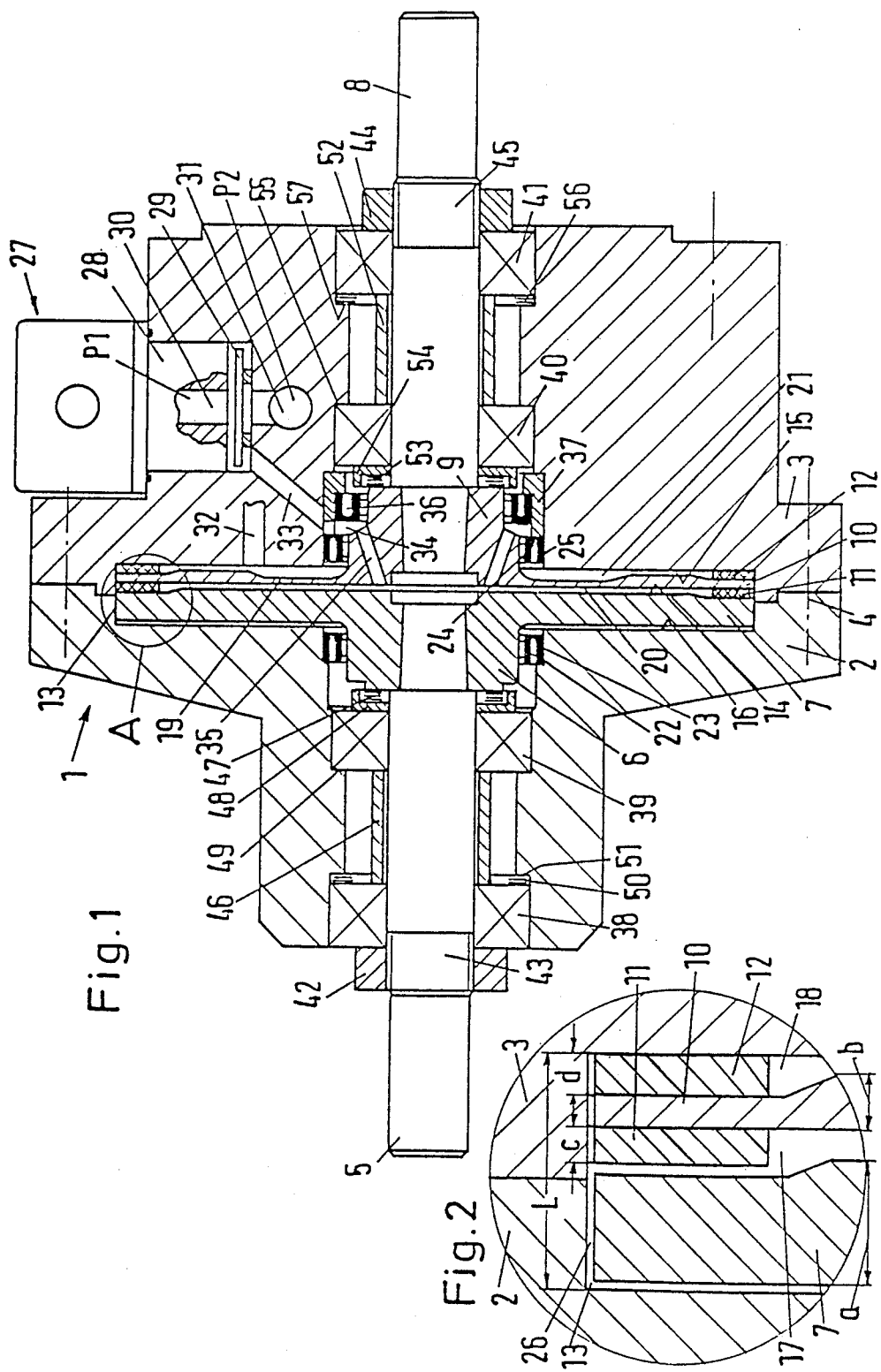

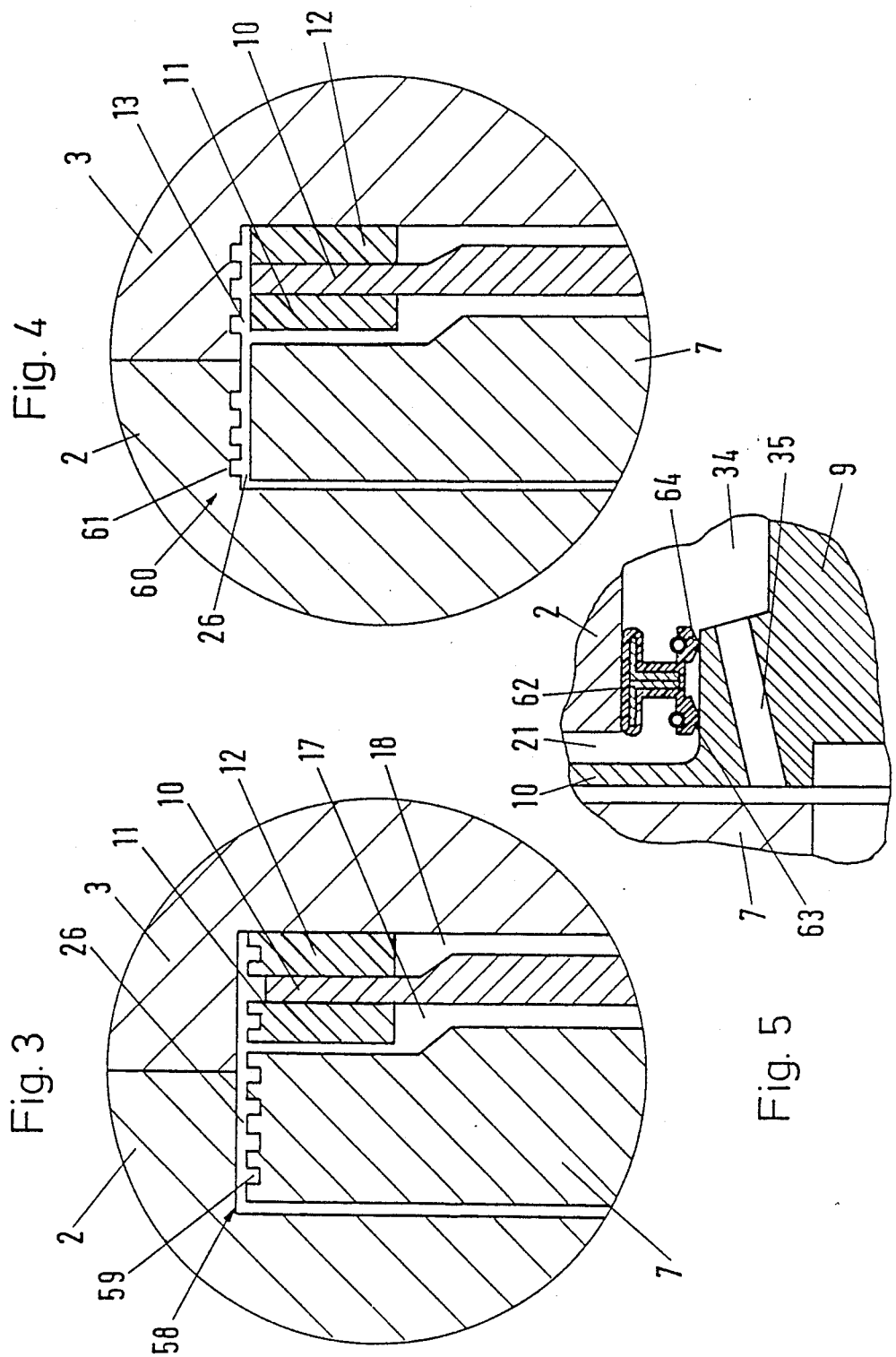

CLUTCH AND BRAKE APPARATUS OPERABLE BY COMPRESSIBLE FLUID, ESPECIALLY PNEUMATICALLY

The invention relates to a clutch and brake apparatus operable by compressible fluid, especially pneumatically, comprising an input and an output shaft mounted in a common housing, wherein a clutch flange connected to turn with the input shaft and a clutch plate connected to turn with the output shaft, are disposed in a clutch chamber of the housing, the marginal zone of the clutch plate can be selectively applied by axial displacement and interpositioning of a respective annular friction lining to an end face of the clutch chamber or of the clutch flange, and two operating chambers are provided which are disposed on opposite sides of the clutch plate and can have different pressures applied to them by a switching apparatus.

Such an apparatus is known from U.S. Pat. No. 3 166 167. The clutch flange and the friction linings are comparatively thick but the clutch plate is thinner. The axial length of the clutch chamber is considerably larger than the sum of the axial thicknesses of the clutch flange, clutch plate and friction linings. The circumferential gap is likewise large. The friction linings can be applied to the clutch plate or to the end faces of the clutch chamber and clutch flange. The clutch plate is either axially displacable on the output shaft or it is elastically deformable. Compressed air is fed to the operating chamber between the clutch flange and clutch plate by way of a housing chamber, an annular chamber in the housing and a passage in the input shaft. The other operating chamber can be supplied with compressed air by way of a passage in the housing and an annular chamber of the housing that surrounds a hub member. The apparatus can assume a neutral position in which the parts are uncoupled, a coupling position in which the input shaft is connected to the output shaft, and a braking position in which the output shaft is braked.

The invention is based on the problem of operating a clutch and brake apparatus of the aforementioned kind so as to have a shorter response time.

This problem is solved according to the invention in that the two friction linings are disposed in marginal depressions of the clutch plate and/or of at least one of the end faces, that the axial length of the clutch chamber is less than the sum of the axial thicknesses of the clutch flange, clutch plate and friction linings, and that the clutch chamber is bounded on both sides by a seal which is arranged between a housing bore adjoining the clutch chamber and a hub member of the clutch flange or clutch plate disposed in the bore.

If a clutch and brake apparatus is operable with the aid of a compressible fluid, i.e., especially pneumatically, the fluid must be supplied or withdrawn by such an amount that not only the change in volume is brought about depending on the stroke, but the required build up and reduction in pressure also take place in the operating chambers. It is therefore not only the changes in volume that are important during operation but also as low a volume as possible for the operating chambers.

According to the invention, the volume of the two operating chambers is considerably less than hitherto. The fluid necessary to change over can be introduced to or withdrawn from the operating chamber correspondingly rapidly. The seals not only serve to bound the operating chambers spatially but also prevent the escape of fluid. Altogether, very short operating times are achieved. One can also work with comparatively small pressure differences between the two operating chambers, for example, in that the atmospheric pressure is not employed in conjunction with an elevated air pressure but with vacuum.

In a further embodiment of the invention, the clutch plate can be fixed to the output shaft and be provided near the hub member with a zone of smaller thickness permitting elastic deformation but radially outwardly thereof with a zone of larger thickness. Compared with known coupling plates which are totally elastically deformable, a greater part of the plate surface is here made thicker to fill the operating chamber.

In this connection, it is recommended that the clutch plate be substantially planar on the side facing the clutch flange and a conduit coming from the switching apparatus opens in the zone of smaller thickness of the clutch plate into the operating chamber defined between the clutch plate and the end face of the clutch chamber. The part of the operating chamber which is necessarily somewhat wider because of the elastic zone communicates directly with the mouth of the conduit so that no additional resistance is applied for filling and discharge.

It is also favourable for the circumferential gap between the clutch chamber and the clutch flange or clutch plate, including the friction linings secured thereto, to be formed as a throttle gap. To achieve rapid switching over, fluid flow that could occur around the outside of the clutch flange and clutch plate by reason of the different pressures on both sides is either prevented or at least retarded.

In the simplest form, the throttle gap is produced in that the diameter of the clutch chamber is made only insignificantly larger than the diameter of the parts turning therein. However, additional measures can also be taken. In particular, the circumferential gap may comprise a labyrinth seal.

In a preferred example, the switching apparatus is disposed on the side of the housing facing the clutch plate, a first conduit passes through the housing to the adjacent operating chamber and a second conduit passes through the housing, through an annular chamber formed between the housing bore and the hub member of the clutch plate and through the hub member to the opposite operating chamber. By concentrating the switching apparatus at one side of the housing, the fluid connections and possibly the electrical connections of the switching apparatus are considerably simplified. The conduits leading to the operating chambers are short.

Further, the annular chamber can be disposed between the seal bounding the pressure chamber and a further seal. In this way, one also prevents fluid from escaping between the switching apparatus and the operating chamber, which likewise contributes to a rapid operating function.

It is very favourable for the seals to be lip seals of which the lips are directed towards the higher pressure to be sealed. Such lip seals can seal against the pressure difference that obtains.

At least the seal separating the clutch chamber from the annular chamber should be a dual lip seal. Such seals can seal against pressure differences occurring on alternate sides. This can be advantageous not only for the said seal but also for the other seals if the apparatus is to be used selectively for compressed air or vacuum operation.

It is of particular advantage for the clutch flange and/or clutch plate to be fixed to the input or output shaft, for the two shafts to be axially displacable in their bearings and for each shaft to be provided with an axial position setting apparatus. The setting apparatus provides adjustment for the axial positions of the clutch flange and clutch plate in the clutch chamber. Despite constricted axial dimensions, one can very accurately set the rest positon of the parts, especially the spacing between the faces co-operating during braking and clutch engagement.

In particular, a setting nut may be adjustable on the shaft and a spring biasing the clutch flange or clutch plate may hold the setting nut against an abutment. The adjustment is therefore brought about by compressing the spring.

In particular, it is favourable for the shaft to be mounted in two axially offset roller bearings of which the inner rings are held at a spacing by a sleeve, for the end of the hub member to be supported against the inner ring of the axially inner roller bearing with the interpositioning of an annular spring and a supporting ring, for the setting nut to be supported against the inner ring of the axially outer roller bearing, and for the outer rings of the roller bearings to be supported against opposed steps of the housing, that of the axially outer roller bearing having an annular spring interposed. The two annular springs, especially undulating ring springs, secure the position with a certain amount of elasticity.

Preferred examples of the invention will now be described in more detail with reference to the drawing, wherein:

FIG. 1 is a diagrammatic longitudinal section through a clutch and brake apparatus according to the invention;

FIG. 2 is an enlarged representation of the actual operating zone in the circle A of FIG. 1;

FIG. 3 is a modification of this operating zone;

FIG. 4 is a further form for this operating zone; and

FIG. 5 is a section through a dual lip seal.

According to FIG. 1, a housing 1 consists of two housing parts 2 and 3 which are interconnected by diagrammatically indicated screws 4. A driven inlet shaft 5 is fixed to a hub member 6 of a clutch flange 7. An output shaft 8 is fixed to a clutch plate 10 by way of a hub member 9. At both sides of the marginal zone of the clutch plate, the latter carries a respective friction lining 11 or 12. The stated parts are disposed in a clutch chamber 13 of the housing 1. The friction linings 11 and 12 can, by axial displacement from a neutral position, come into selective contact with an end face 14 of the clutch flange 7 or an end face 15 of the clutch chamber 13. The opposed end wall 16 of the clutch chamber 13 is parallel to the end wall 15.

The clutch flange 7 has a depression 17 in its marginal zone (radial outer portion) to receive the friction lining 11. The clutch plate 10 has a depression 18 in its marginal zone (radial outer portion) to receive the friction lining 12. The axial length L of the clutch chamber 13 is less than the sum of the axial thickness a of the clutch flange 7, the thickness b of the clutch plate 10, the thickness c of the friction lining 11 and the thickness d of the friction lining 12. The clutch flange 7 has this thickness a throughout between the hub member 6 and depression 17. The clutch plate 10 has this thickness b between the marginal zone and a radial inner, annular thinner elastic zone 19 which permits axial displacement of the marginal zone.

In this way, one obtains two operating chambers 20 and 21 of very small volume at both sides of the clutch plate 10. The length of stroke of the friction linings 11 and 12 is in the region of 1 mm, preferably 1/10 mm. Because of the small height of the operating chambers, one can very rapidly build up the desired pressure in them by means of a compressible fluid such as air.

The clutch chamber 13 is bounded on one side by a seal 22 placed between the hub member 6 of the clutch flange 7 and a housing bore 23 surrounding the flange. On the other side, the chamber is bounded by a seal 24 placed between the hub member 9 of the clutch plate 10 and a housing bore 25 surrounding same. These seals also help to keep the operating chamber small.

The circumferential gap 26 between the inner circumference of the clutch chamber 13 and the outer circumference of the clutch flange 7 and the clutch plate 10 with the friction linings 11 and 12 is in the form of a throttle gap, i.e., it has a width of less than 0.5 mm, preferably less than 0.1 mm. This avoids or retards the escape of air from the operating chambers 20 and 21 to the respective opposite side of the clutch flange 7 and clutch plate 10.

A switching apparatus 27 comprises two valves 28 of which only one is shown. In the illustrated position of the valve plate 29, the operating chamber 20 is connected to a passage 30 at a first pressure P1 and in the other position of the valve plate 29 it is connected to a passage 31 at a pressure P2. The valve 28 for the other operating chamber 21 works conversely. The pressure P1 can for example be atmospheric pressure. The pressure P2 can be selectively a positive pressure or a vacuum. The pressures P1 and P2 can also be two different pressures which vary differently from atmospheric pressure.

The one valve 28 communicates by way of a conduit 32 in the form of a housing passage with the end 15 of the clutch chamber 13 in the region of the elastic part 19 of the clutch plate 10. The conduit connecting the other valve 28 to the operating chamber 20 consists of a housing bore 33, an annular chamber 34 between the hub member 9 and housing bore 25 and a passage 35 in this hub member 9. The annular chamber 34 is bounded on one side by the seal 24 and on the other side by a seal 36 disposed between the hub member 9 and an insert ring 37.

If the pressure in the operating chamber 20 is higher than in the operating chamber 21, the output shaft 8 is braked by the friction lining 12 abutting the end face 15 of the clutch chamber 13. If the pressure in the operating chamber 21 is higher than in the operating chamber 20, the output shaft is coupled to the input shaft 5 by the friction lining 11 abutting the end face 14 of the clutch flange 7. If the switching apparatus 27 permits an additional switching possibility to connect the passages 30 and 31 to the same pressure, the clutch plate can assume a neutral position in which the output shaft 8 can turn freely.

The input shaft 5 is mounted in two roller bearings 38 and 39 and the output shaft 8 in two roller bearings 40 and 41. The shafts are mounted to rotate about coextensive rotary axes with their one ends adjacent to one another. To set the axial position of the clutch flange 7, a setting nut 42 is screwed onto a thread 43 of the input shaft 5. To set the axial position of the clutch plate 10, a setting nut 44 is screwed onto a thread 45 of the output shaft 8. The inner rings of the two roller bearings 38 and 39 are held at a spacing by a sleeve 46. The end face of the hub member 6 is supported against the inner ring of the axially inner roller bearing 39 with the interpositioning of an undulating ring spring 47 and a supporting ring 48. The setting nut 42 is supported against the inner ring of the axially outer roller bearing 38. The outer ring of the axially inner roller bearing 39 lies against a step 49 of the housing. The outer ring of the other roller bearing 38 is supported against a second step 51 of the housing with the interpositioning of an undulating ring spring 50. Similarly, for the roller bearings 40 and 41 there is a spacing sleeve 52, an undulating annular spring 53 and a supporting ring 54 which, in the same way as the setting nut 44, co-operate with the inner rings, as well as a housing step 55 and an undulating ring spring 56 co-operating with a further housing step 57 for the outer rings of the two roller bearings. If, for example, the setting nut 44 is turned clockwise, the spacing between the setting nut 44 and hub member 9 is reduced, the undulating ring spring 53 being compressed. Since the position of the outer rings of the roller bearings 40 and 41 is determined by the housing shoulder 53, and thus also the position of the inner rings, one can in this way very accurately set the axial position of the clutch plate 10. The same applies to the clutch flange 7.

FIG. 3 shows a labyrinth seal 58 in conjunction with the throttle gap 26. For this purpose, the outer periphery of the clutch flange 7 and the friction linings 11 and 12 are provided with channels or grooves 59. In addition, the clutch plate 10 has a slightly smaller diameter than the adjacent parts. Each throttling gap section is therefore followed by an expansion chamber so that the pressure is reduced in steps and no substantial air flow is created.

FIG. 4 shows a labyrinth seal 60 in which the gap 26 is associated with grooves or channels 61 in the circumferential wall of the clutch chamber 13. This likewise provides the known labyrinth sealing effect.

In FIG. 5, a double lip seal 62 is provided instead of the seal 25. One lip 63 faces the operating chamber 21 and the other lip 64 faces the annular chamber 34. In addition, the lips are biased by an annular spring. Sealing is always effected by the lip facing the chamber at higher pressure. Similar double lip seals can also replace the seals 23 and 36.

Many departures can be made from the illustrated embodiment without departing from the basic concept of the invention. For example, the friction linings 11 and 12 may be applied to the clutch flange 7 and/or to the end wall of the clutch chamber. If the clutch plate 10 is displacable on the output shaft 8, it may have the thickness b up to the hub member 9. The depressions 17 and 18 can also both be formed on the clutch plate 10. Such a depression can also be provided in the end wall 15 of the clutch chamber 13.

I claim:

1. A clutch and brake apparatus operable by compressible fluid, comprising a housing having wall means that at least in part define a clutch chamber and includes axially opposite first and second end walls, an output shaft, an input shaft, means mounted by the housing for mounting the shafts for rotation about coextensive rotary axes, the input and output shafts having adjacent first ends, a clutch flange mounted to the input shaft adjacent end to rotate therewith, a clutch plate mounted to the output shaft adjacent end to rotate the output shaft, the clutch plate and flange each having a radial inner and a radial outer portion, the clutch flange and plate extending within the clutch chamber to provide a first operating chamber axially between the flange and plate, a second operating chamber, the plate being axially between the first and second chambers, and axially between the clutch flange and the second end wall, control means for creating a pressure differential between the first and second operating chambers to selectively operate the clutch plate to a braking condition and to a driving condition, each of the end walls having a radial inner and a radial outer portion, at least two of the radial outer portions of the clutch plate, the clutch flange and one of the end walls radial outer portions having a first and a second depression respectively that is axially spaced from the other of the first and second depression, and a first and a second friction liner mounted by at least one of the radial outer portions of the clutch plate, the clutch flange and one of the end walls to extend axially within the first and second depression respectively and at least one of the clutch plate and the clutch flange extending between the friction liners, the axial dimension of the clutch chamber radial outer portions being less than the combined axial thickness of the clutch plate and clutch flange radially inward of the depressions, and the friction liners.

2. The apparatus of claim 1, further characterized in that each of the clutch flange and clutch plate has a hub member mounted on the input and output shafts respectively, the hub members being radially inwardly of the flange and plate radial inner portions respectively, that the housing has wall parts radially outwardly of the flange and plate hub members to define a first and a second bore respectively that opens to the clutch chamber and that there is provided a seal in the first and second bore radially between the respective wall portion and hub member to in part define the clutch chamber.

3. The apparatus according to claim 2, characterized in that the clutch plate hub member is mounted in a fixed axial position on the output shaft, that the clutch plate radial inner portion has an annular radial inner part of an axial thickness to permit elastic deformation when there is a pressure differential between the operating chambers and an annular radial outer part of a greater axial thickness than the annular radial inner part.

4. The apparatus according to claim 3, characterized in that the clutch plate has a side facing the clutch flange that is generally planar and that the control means includes a housing portion that defines a conduit that opens to the second operating chamber axially adjacent to the clutch plate radial inner part.

5. The apparatus according to claim 2, characterized in that the wall means includes a circumferential wall that in combination with at least one of the clutch plate and clutch flange are of relative circumferences to form a circumferential throttle gap.

6. The apparatus according to claim 5, characterized in that the circumferential wall and the at least one of the clutch plate and clutch flange cooperatively form a labyrinth seal.

7. The apparatus according to claim 2, characterized in that the control means includes a first housing portion that at least in part defines a first conduit that opens to the second operating chamber, a second housing portion that forms a second conduit first part that opens to the second bore and a hub portion that forms a second conduit second part having one end in fluid communication with the second conduit portion first part and an axial opposite end that opens to the first operating chamber.

8. The apparatus according to claim 7, characterized in that there are provided first and second seal members on the clutch plate hub member to in cooperation with the housing provide an annular chamber within the second bore that opens to the second conduit first part and the second conduit second part opposite end.

9. The apparatus according to claim 8, characterized in that the seal members are lip seals that have lips directed to the higher pressure against which sealing takes place.

10. The apparatus according to claim 8, characterized in that one of the seal members is located axially between the annular chamber and the second operating chamber and is a dual lip seal.

11. The apparatus of claim 7 further characterized in that the second conduit first part opens to the housing second bore axially opposite the clutch plate from the clutch flange.

12. The apparatus according to claim 2, characterized in that the means for mounting the shafts comprises first and second bearing means for mounting the shafts for axial displacement and means for retaining the shafts in selected axially adjusted positions relative to the housing.

13. A clutch and brake apparatus operable by compressible fluid, comprising a housing having wall means that at least in part define a clutch chamber and includes axially opposite first and second end walls, an output shaft, an input shaft, means mounted by the housing for mounting the shafts for rotation about coextensive rotary axes, the input and output shafts having adjacent first ends, a clutch flange mounted to the input shaft adjacent end to rotate therewith, a clutch plate mounted to the output shaft adjacent end to rotate the output shaft, the clutch plate and flange each having a radial inner and radial outer portion, the clutch flange and plate extending within the clutch chamber to provide a first operating chamber axially between the flange and plate and a second operating chamber, the plate being axially between the first and second chambers, and axially between the clutch flange and the second end wall, control means for creating a pressure differential between the first and second operating chambers to selectively operate the clutch plate to a braking condition and to a driving condition, each of the end walls having a radial inner and a radial outer portion, at least two of the clutch plate, clutch flange and one of the end walls radial outer portions having a depression, and a friction liner mounted in each depression, the axial dimension of the clutch chamber radial outer portion being less than the combined axial thickness of the clutch plate and clutch flange radially inward of the depressions, and the friction liners, each of the clutch plate and clutch flange radial inner portion having a radial outer part and a radial inner part, the clutch plate radial outer part being of a greater axial thickness than that of the clutch plate radial inner part, each of the clutch flange and clutch plate having a hub member mounted on the input shaft and output shaft respectively, the hub members being mounted in fixed axial positions on the respective shaft and being located radially between the clutch plate radial inner part and the output shaft and the clutch flange radial inner part and the input shaft respectively, the clutch plate radial inner part being of an axial thickness to permit elastic deformation when there is a pressure differential between the operating chambers.

14. The apparatus according to claim 13, characterized in that the control means includes a first housing portion that at least in part defines a first conduit that opens to the second operating chamber, a second housing portion that forms a bore opening to the adjacent hub member, a second conduit portion first port that opens to the bore and a hub portion of the said adjacent hub member that forms a second conduit second part having one end in fluid communication with the second conduit portion first part and an axial opposite end that opens to the first operating chamber, the housing first portion having the first conduit and the second conduit first part located axially on the same side of the clutch chamber.

15. The apparatus according to claim 13, characterized in that the clutch plate has one of the depressions and mounts one of the friction liners.

16. A clutch and brake apparatus operable by compressible fluid, comprising a housing having wall means that at least in part define a clutch chamber and includes axially opposite first and second end walls, an output shaft, an input shaft, means mounted by the housing for mounting the shafts for rotation about coextensive rotary axes, the input and output shafts having adjacent first ends, a clutch flange mounted to the input shaft adjacent end to rotate therewith, a clutch plate mounted to the output shaft adjacent end to rotate the output shaft, the clutch plate and flange each having a radial inner and radial outer portion, the clutch flange and plate extending within the clutch chamber to provide a first operating chamber axially between the flange and plate and a second operating chamber, the plate being axially between the first and second chambers, and axially between the clutch flange and the second end wall, control means for creating a pressure differential between the first and second operating chambers to selectively operate the clutch plate to a braking condition and to a driving condition, each of the end walls having a radial inner and a radial outer portion, at least two of the clutch plate, clutch flange and one of the end walls radial outer portions having a depression, and a friction liner mounted in each depression, the axial dimension of the clutch chamber radial outer portion being less than the combined axial thickness of the clutch plate and clutch flange radially inward of the depressions, and the friction liners, each of the clutch flange and clutch plate having a hub member mounted on the input and output shafts respectively, the hub members being radially inwardly of the flange and plate radial inner portions respectively, the housing having wall parts radially outwardly of the flange and plate hub members to define a first and a second bore respectively that opens to the clutch chamber, a seal in each of the first and second bore radially between the respective wall portion and the hub member to in part define the clutch chamber, the clutch plate and clutch flange being mounted on the respective shaft in fixed axial relationship relative to the shafts, the means for mounting the shafts comprising first and second bearing means for mounting the shafts for axial displacement and means for retaining the shafts in selected axially adjusted position relative to the housing, the means for retaining the shafts comprising a setting nut on each shaft that is adjustable relative to the respective shaft and abutable against the respective first bearing means, first spring means acting between the clutch plate and the second bearing means that is on the output shaft to bias the last mentioned second bearing means away from the clutch plate, and second spring means acting between the clutch flange and the second earing means that is on the input shaft to bear against the last mentioned second bearing means to bias the second bearing means on the input shaft away from the clutch flange, the housing having abutment portions against which the second bearing means abuts to limit the movement of the second bearing means on the respective shaft away from the other.

17. The apparatus according to claim 16, characterized in that the means for retaining includes a sleeve on each shaft for retaining the first and second bearing means on the respective shaft in axial spaced relationship.

* * * * *